United States Patent
Bailey et al.

(10) Patent No.: US 6,639,961 B2
(45) Date of Patent: *Oct. 28, 2003

(54) NUCLEAR FUEL PELLET LOADING METHOD AND MACHINE FOR SAME

(75) Inventors: William E. Bailey, Lynchburg, VA (US); Dimick D. Heller, Bedford, VA (US); Steven D. Overby, Rustburg, VA (US)

(73) Assignee: Framatome Cogema Fuel Co., Lynchburg, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/575,887

(22) Filed: May 22, 2000

(65) Prior Publication Data

US 2003/0103593 A1 Jun. 5, 2003

(51) Int. Cl.[7] ............................................. G21C 19/00
(52) U.S. Cl. ..................... 376/268; 376/260; 376/261; 414/146; 294/906; 198/453; 198/454
(58) Field of Search .................. 376/268, 261, 376/260; 414/146; 294/906; 198/453, 454

(56) References Cited

U.S. PATENT DOCUMENTS

| | | | | |
|---|---|---|---|---|
| 3,897,673 A | * | 8/1975 | Kee et al. ........................ | 53/61 |
| 3,925,965 A | * | 12/1975 | Rushworth ................. | 53/112 R |
| 4,235,066 A | * | 11/1980 | King et al. ..................... | 53/500 |
| 4,292,788 A | * | 10/1981 | King ............................ | 53/500 |
| 4,468,163 A | * | 8/1984 | King et al. ..................... | 414/21 |
| 4,566,835 A | * | 1/1986 | Raymond et al. .............. | 414/53 |
| 4,748,798 A | * | 6/1988 | Udaka et al. .................. | 53/504 |
| 4,980,119 A | * | 12/1990 | Schoenig ..................... | 376/261 |
| 5,251,244 A | * | 10/1993 | Wazybok et al. ............ | 376/261 |

FOREIGN PATENT DOCUMENTS

| | | | | |
|---|---|---|---|---|
| JP | 363286790 A | * | 11/1988 | ............ G21C/3/28 |

* cited by examiner

*Primary Examiner*—Peter M. Poon
*Assistant Examiner*—Andrea M. Valenti
(74) *Attorney, Agent, or Firm*—Vytas R. Matas

(57) ABSTRACT

An automated machine for loading nuclear reactor fuel, BP, or APSR pellets from small trays having rows of pellets into reactor rods of long length wherein the pellets are individually counted and loaded into rows of a loading tray according to the desired number of pellets per row and total number of pellets per tray with the loading tray controls being moved to a que tray where they may be weighted and there from to an unloading tray for sequential row loading into the reactor rod.

5 Claims, 2 Drawing Sheets

NUCLEAR FUEL PELLET LOADING METHOD AND MACHINE FOR SAME

BACKGROUND OF THE INVENTION

1. Field of the Invention

The present invention generally relates to a machine and method for loading nuclear fuel pellets into a nuclear fuel rod for use in a nuclear reactor.

2. Description of the Prior Art

Nuclear fuel pellets are classified as fuel, burnable poison (BP) or axial power shaping rod (APSR) pellets. Fuel pellets are used in nuclear fuel rods used to power the reactor. BP pellets are used in guide tubes of the fuel which tubes control the fuel reaction of the reactor. ASPR pellets are used in the axial power shaping rods of the reactor. Pellets are shaped in cylindrical form approximately $\frac{3}{8}$ inch in diameter and approximately $\frac{1}{2}$ inch to $\frac{3}{4}$ inch in length.

BP and APSR pellets are shipped to the fuel loading area in bulk since there is no criticality factor to consider as is the case in fuel pellets which may go critical if stacked more than 4 inches in height depending on the array. Therefore, fuel pellets are shipped to the fuel loading area in single layer corrugated trays approximately 8 inches square. This size tray is sufficient to fill a single 12-foot fuel rod.

The fuel rod loading process begins with the trays being visually inspected and any missing pellets being added to the trays. Since the enriched uranium in a fuel rod can be detected on a weight basis, the full trays are weighed to determine the desired enrichment for a single fuel rod and some of the pellets are then removed if necessary. The calibrated tray is then placed in a loading machine which aligns the first row of the tray with the open end of a 12-foot fuel rod. The rows of the tray are then sequentially pushed into the fuel rod until the entire tray is emptied into the fuel rod. This process is then repeated for the next fuel rod.

For bulk delivered nuclear pellets such as BP and APSR pellets it is known to load them into trays using rotating hoppers. Examples of such hopper loading systems are found in US Pat. No. 4,765,453 and U.S. Pat. No. 5,489,184. However, none of these patents teach an automatically operating machine where the pellets are automatically counted as they are placed on a tray to assure the proper number of pellets on the tray to fill a single fuel rod nor of automatically weighting the filled tray to insure the proper enriched uranium content of the fuel rod prior to automatically loading the pellets into the fuel rod.

To accomplish this a new machine was needed to automate these, previously manual processes.

SUMMARY OF THE INVENTION

The present invention solves the problems associated with prior art nuclear pellet loading machines and methods, as well as other, by providing an nuclear pellet loading machine which loads pellets into a nuclear tube.

The loading machine has a hopper which delivers the pellets loaded therein unto a conveyor belt which delivers them to a set of pinch rollers and unto a queuing tray comprising a series of 13 parallel rows for holding the pellets in the rows. The pinch rollers have a counting mechanism for counting the number of pellets being entered onto the queuing tray and controls the movement of the tray rows with respect to the pinch rollers to make sure each row has the proper number of pellets and that the tray has the proper total number of pellets. Once this tray is completed, its contents are moved unto an adjoining identical tray which has a weight apparatus associated therewith to weight the total pellets on the tray to conform the pellets to the needed reactivity of the nuclear tube to be filled. Once the proper weight is determined to be had, the contents of the tray are moved to a third identical loading tray from which the pellet contents are moved to have each row of the tray sequentially inserted in a straight line to a nuclear tube connected to the machine. Once each tray is emptied it returns to its home position and its process is repeated. Once the tube is filled and removed from the machine a new nuclear tube is aligned with the machine and the process of loading is repeated.

In view of the foregoing it will be seen that one aspect of the present invention is to provide a fully automated nuclear pellet-loading machine.

Another aspect of the present invention is to provide a fully automated nuclear fuel pellet-loading machine which provides fuel rods of desired enriched uranium content.

Yet another aspect of the present invention is to provide a fully automated nuclear pellet-loading machine able to load bulk pellets to reactor rods.

These and other aspects of the present invention will be more fully understood after a detailed review of the foregoing description of the preferred embodiment when considered with the accompanying drawings.

DESCRIPTION OF THE PREFERRED EMBODIMENT

Figure 1:
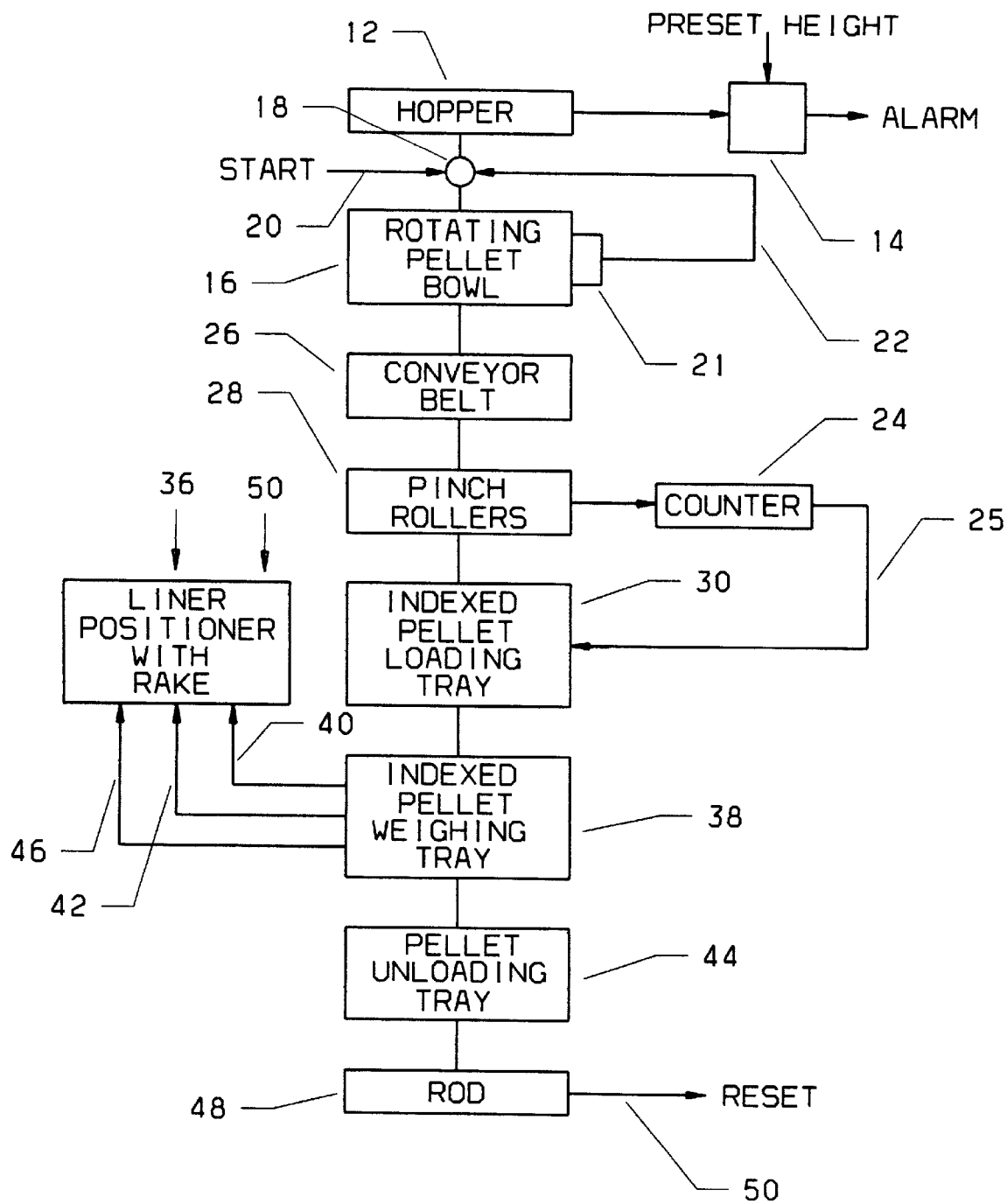
FIG. 1 is a flow sheet drawing of the automated reactor rod loading method of the present invention.

Referring now to the drawings, it will be seen that the automated reactor pellet-loading machine (10) operates as follows.

A hopper (12) is loaded with bulk nuclear reactor pellets. Since BP and APSR pellets cause no critically (critical mass) problems the hopper (12) may be manually loaded to the top. However, if fuel pellets are to be used, a 4-inch height must be observed. Thus a hopper pellet height detector (14) preset for this height is utilized. When this height is reached the detector activates an alarm warning of any further full pellet addition.

The hopper (12) feeds a rotating pellet bowl (16) by a vibrating pan (18) which is operated by a start signal along line (20) to drop pellets into the rotating bowl (16) until it is shut off by a signal along line (22) from an optical switch (21).

Figure 2:
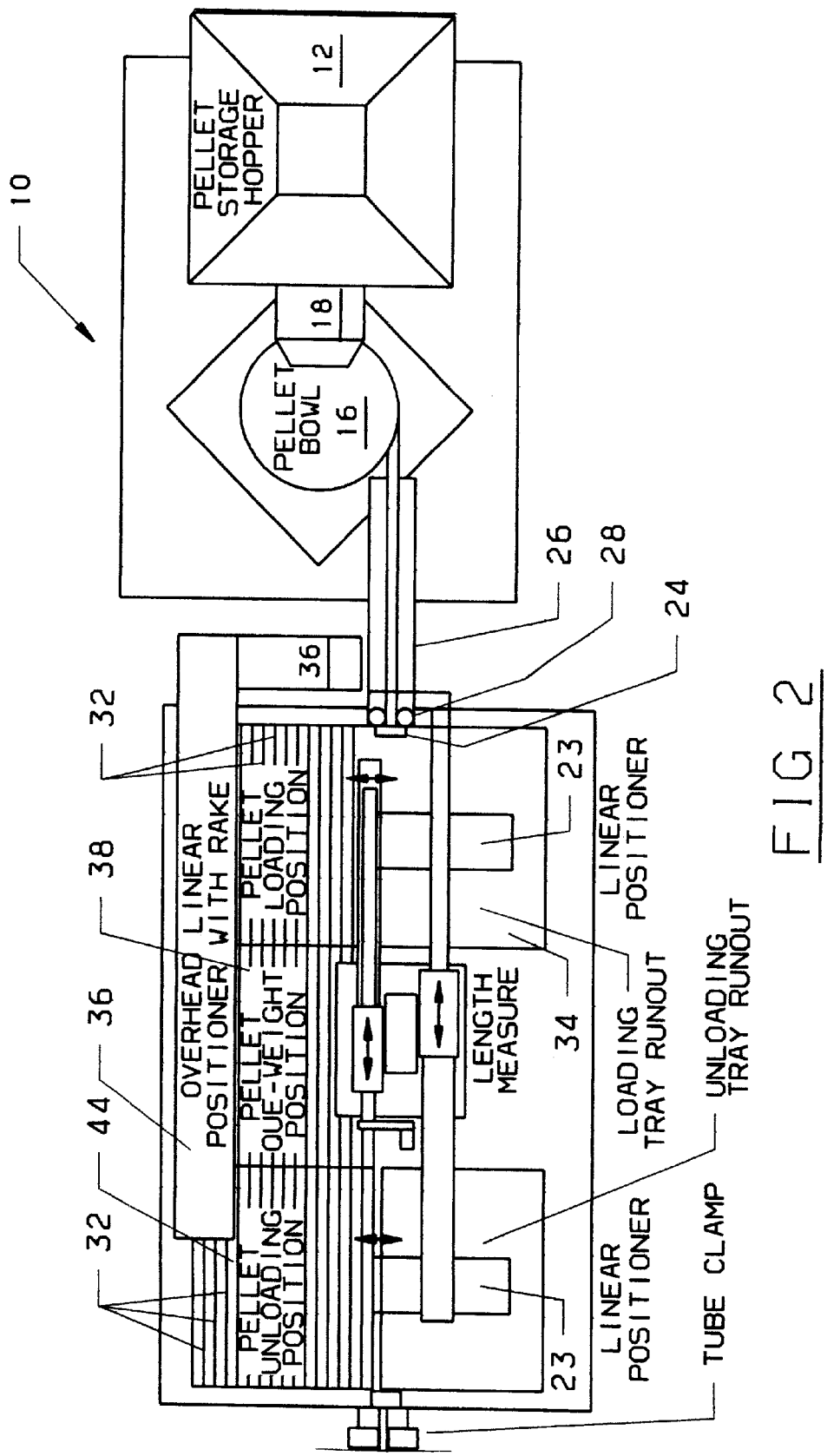
FIG. 2 is a top schematic view of the reactor rod-loading machine of the present invention

The rotating bowl (16) feeds individual spaced pellets unto a conveyor belt (26) which is mechanically connected to a set of pinch rollers (28) which pass single pellets unto an indexed pellet-loading tray (30). The pellets are counted as they enter the tray (30) by the optical counter (24). The tray (30) is shown in FIG. 2 in its initial loading position and has a plurality of corrugated rows (32) each holding approximately 20 to 21 pellets. The tray (30) is indexed to move down one row when the counter (24) reaches the correct count. The movement is sequentially done by a linear positioner (23). The counter is reset to zero and starts the next row (32) count. The counter (24) also has a cumulative counter that totals the pellets.loaded into all the rows (32) of the tray (30) until the number needed to fill a reactor rod is reached. The counter (24) now sends signal along line (25) to the pinch rollers (28) to turn off any further pellet flow from the conveyor belt (26). The tray (30) is now in the "loading tray run out" area (34). This same signal along line (25) is passed to the linear positioner to initiate the movement of the filled tray (30) back to its original position shown in FIG. 2 and the sliding of the pellets by the rake (36) portion into the pellet que and weighting tray (38) which is identical to the tray (30) except that it is located over a weighting device.(not shown).

For BP and APSR pellets, the weighting is unnecessary and the entire tray (30) can be moved to the tray (38). As was mentioned earlier, for fuel pellets the w eight is an indication of reactivity and the pellet transfer will occur only when the desired weight or reactivity is confirmed. Thus, for fuel pellets the desired weight is inputted as a set point to a known comparator which compasses it with the predetermined set point weight to establish a control signal along line (40) to the linear positioner (36) indicating a completing of the pellet transfer to the tray (32). For BR and APSR pellets the end of the rake travel along tray (32) will establish a control signal along line (42) to the linear positioner (36) indicating same.

The linear positioner then moves to the tray (38) and with the rake (36) moves the pellets to a pellet unloading tray (44) which is identical to the trays (30) and (38). When the rake (36) reaches the end of the tray (38), a control signal is established along line (46) for the linear positioner to move to tray unloading tray (44). Here the positioner (23) sequentially aligns each row (32) of the tray (44) with a tube (48) of the reactor rod until all the pellets from tray (44) are loaded into the tube. This places the tray (44) into the unloaded tray position and established a reset signal along line (50) to the positioner (23) to move the tray (44) back to its original position, to have the positioner move back to alignment with the tray (32).

To avoid the potential criticality of fuel pellets reaching a height in excess of 4 inches in the hopper (12), the conveyor could be coupled to prior art fuel trays received for loading coupled to a known unloading assembly which would feed the contents of a tray to the conveyor (26) for proper count and weight in the counter (24) and the weight tray (38) of the machine (10).

The control elements and hardware needed to implement this system are well known in the automatic control area and details of same have been deleted herein for the sake of conciseness and readability but are fully intended to fall within the scope of the following claims.

What is claimed is:

1. An automated system for loading nuclear fuel pellets into tubes used to control power in the reactor comprising:

a pellet-loading tray comprising a series of rows of fuel pellet holders;

means for feeding individual fuel pellets to the rows of said loading tray including a hopper connected to deposit a number of pellets unto a rotary bowl for individually feeding the pellets to a conveyor;

a counter for determining that a preset number of pellets are loaded into each row of said series of rows of said loading tray including a pair of pinch rollers for counting said individually fed pellets;

a que and weighing tray connected to said pellet loading tray for transferring and weighing said pellets there from and establishing a control signal indicative of said weight of fuel pellets on said que tray;

a pellet unloading tray having rows of pellet holders and being sequentially connected to said que tray; and control means for moving the fuel pellets from said pellet loading tray to said que tray when said loading tray is filled with the preset number of pellets and therefrom to said unloading tray for sequential row loading into said reactor control tubes only when the control signal from said que and weighing tray equals a preset weight indicative of proper control tube reactivity.

2. A system as set forth in claim 1 wherein said pellets are fuel pellets and said feeding means includes an alarm for indicating that a critical height of said fuel pellets is loaded in said feeding means.

3. A system as set forth in claim 1 wherein said counter comprises an optical counter mounted proximate an outlet of said pinch rollers.

4. A system as set forth in claim 3 herein said counter establishes control signals to said control means to sequentially move each row of said loading tray in alignment with said feeding means upon counting the preset number of pellets entering each row.

5. A system as set forth in claim 4 wherein said counter includes a cumulative counter of the total number of pellets to be loaded in said loading tray and establishes a control signal to said control means and said feeding means to cease feeding pellets to said loading tray and to align said loading tray with said que tray for transferring the pellets thereto.

* * * * *